United States Patent
Palleschi et al.

(10) Patent No.: US 8,425,962 B2
(45) Date of Patent: Apr. 23, 2013

(54) FRUIT AND VEGETABLE PRESERVATION PROCESS

(75) Inventors: Melissa Anne Palleschi, Fremont, CA (US); Karim Nafisi-Movaghar, Walnut Creek, CA (US)

(73) Assignee: Del Monte Corporation, San Francisco, CA (US)

( * ) Notice: Subject to any disclaimer, the term of this patent is extended or adjusted under 35 U.S.C. 154(b) by 74 days.

(21) Appl. No.: 12/715,589

(22) Filed: Mar. 2, 2010

(65) Prior Publication Data

US 2011/0217435 A1 Sep. 8, 2011

(51) Int. Cl.
*A23B 7/00* (2006.01)
*A23B 7/005* (2006.01)

(52) U.S. Cl.
USPC ............ 426/321; 426/324; 426/325

(58) Field of Classification Search .......... 426/321, 426/324, 325
See application file for complete search history.

(56) References Cited

U.S. PATENT DOCUMENTS

| | | | |
|---|---|---|---|
| 1,666,551 | A | 4/1928 | Butler et al. |
| 6,033,701 | A | 3/2000 | Hirsch |
| 6,033,717 | A | 3/2000 | Agterof et al. |
| 6,177,115 | B1 | 1/2001 | Meyer |
| 6,207,215 | B1 | 3/2001 | Wilson et al. |
| 6,537,601 | B1 | 3/2003 | Voisin |
| 2004/0071845 | A1 | 4/2004 | Hekal et al. |
| 2004/0156960 | A1 | 8/2004 | Villota et al. |
| 2004/0191382 | A1 | 9/2004 | Cooper et al. |
| 2005/0112252 | A1 | 5/2005 | Tewari |
| 2007/0237865 | A1 | 10/2007 | Love et al. |
| 2008/0311259 | A1 | 12/2008 | Singh et al. |

FOREIGN PATENT DOCUMENTS

JP 03180143 A * 8/1991

OTHER PUBLICATIONS

International Search Report and Written Opinion mailed May 12, 2011 for International Application No. PCT/US2011/000375.
Ohio State University Extension Fact Sheet, "High Pressure Processing Fact Sheet for Food Processors", ohioline.osu.edu/fse-fact/0001.html, Jun. 19, 2009.

* cited by examiner

*Primary Examiner* — Jyoti Chawla
(74) *Attorney, Agent, or Firm* — Buchanan Ingersoll & Rooney PC

(57) ABSTRACT

An HPP method for preserving a food item such as a fruit or vegetable may include the steps of: (a) placing a prepared fruit and/or vegetable in a container having a capacity less than about two gallons; (b) filling the container with a pH modifying solution or sauce to establish a pH in the container in the range of about 2 to about 6, and preferably about 4; (c) dearation; (d) sealing the container; and (e) applying pressure to the container in the range of about 2,000 to about 120,000 psi, preferably about 90,000 psi, for a time period in the range of about 1 to about 20 minutes, preferably about 5 minutes at a temperature in the range not lower than freezing and not greater than about 230° F.

15 Claims, 1 Drawing Sheet

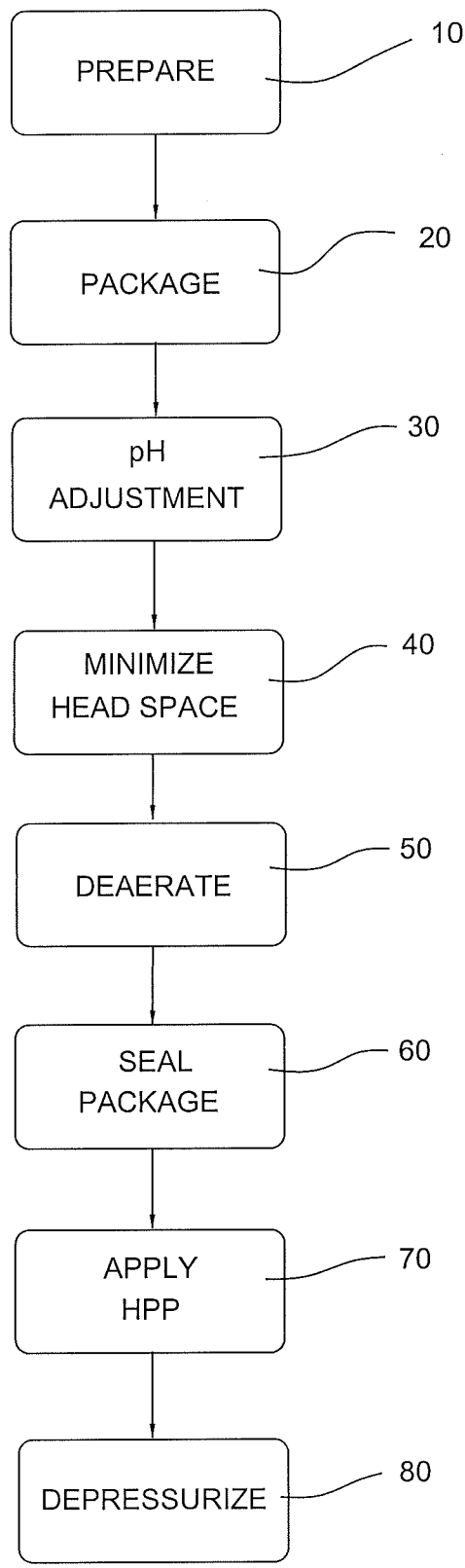

FRUIT AND VEGETABLE PRESERVATION PROCESS

FIELD OF THE INVENTION

This invention relates generally to a preservation process for food items such as fruits, vegetables, and combinations thereof. More particularly, this invention concerns an improved high pressure processing process for preservation of such food items.

BACKGROUND OF THE INVENTION

The use of high pressure processing ("HPP") for microbial inactivation is known in the literature. (See, for example, Ohio State University Extension Fact Sheet, "High Pressure Processing Fact Sheet for Food Processors", ohioline.osu.edu/fse-fact/0001.html).

In addition to the literature, various patent publications deal with high-pressure processing. Generally speaking, those patent publications are concerned with processes having both high-pressure and high temperature processing steps. Furthermore, high-pressure processes for fruit have not been identified.

For example, U.S. Pat. No. 6,033,701, issued to Hirsch discloses a process to sterilize foods, prevent the ripening of some fruits and vegetables, and allow preservation of food components. The various examples described by Hirsch involved application of a low pressure of 25,000 psi applied over a long period of 5-8 days. The examples show successful pasteurization of several fruits, such as apricots, black grapes, blueberries, kiwi, mango, peaches, and pears as well as the successful pasteurization of multiple vegetables. The method described is a batch process. According to Hirsch, whole, peeled or cut fruit may be surrounded by a solution of vitamin C, citric acid, or both to prevent or reduce discoloration. The low pressure process did not work for white grapes, beef, and emu meat; however, after the initial treatment, preservation was obtained by then surrounding the product with yogurt and re-pressurizing it. This multi-step process using yogurt did not work on green grapes, which still turned brown.

Published U.S. Appl'n. No. 2007/0237865 of Love et al. concerns a high pressure process for processing foods after packaging to extend shelf life and eliminate bacteria. Suitable food products include protein, vegetables, sauces, and starches, as well as seafood. In the process, the food product is prepared by grilling, baking frying boiling, steaming or marinating. Then the food is vacuum sealed before being pressurized. Pressure in the range of 25,000 psi to 120,000 psi is applied for a duration of 1 to 30 minutes.

Published U.S. Appl'n. No. 2004/0191382 of Cooper et al. involves sterilization of vegetables, particularly potatoes having a pH of at least 4.5. The exemplary vegetable (potato) is precooked before being packaged, and prior to the pressurization process. In addition, the application describes a multiple-step pressurization process, with a pressure of at least 50,000 psi being applied in total for less than 20 minutes. A single-step process is disclosed, where preheated products (60 to 90° C.) are subjected to pressures of at least 100,000 psi for at least 5 minutes.

U.S. Pat. No. 6,207,215 to Wilson et al. concerns a method for sterilizing and processing foods, particularly low-acid (i.e., pH 4.6) canned foods. Suitable foods include, for example, pet foods, main meals, sauces, soups, stews, vegetables, beverages, and juices. Wilson et al. use a combination of high pressure and high temperature to sterilize. The pressures listed range from at least 75,000 psi to less than 250,000 psi. Raw meat is used in the examples. According to Wilson et al. high acid foods (pH<4.6) are not prone to the growth of pathogens Published U.S. Appl'n. No. 2005/0112252 to Tewari relates to a process for extending product shelf-life by inactivating microorganisms. A food product is placed in a flexible, sealed, vacuumed container, which is then placed in a processor where the temperature of a pressurizing medium is lowered to a minimum of 10 degrees Fahrenheit. Pressure of the medium is adjusted to be between 10,000 and 130,000 psi. The pressure is held for a minimum of 0.1 seconds. Examples applied the process to salad dressing, salsa, black pepper, and fresh fruits, specifically sliced cantaloupe and peaches. After the food is placed in the container and sealed, the container may be surrounded by a pressurizing medium in the HPP unit. The pressurizing medium may be chilled water or another liquid.

Published U.S. Appl'n. No. 2008/0311259 of Singh et al. deals with egg products placed into a pressurization chamber maintained between 70,000 and 87,000 psi to kill or deactivate undesirable or target pathogens.

U.S. Pat. No. 6,177,115 to Meyer concerns a two-step batch process involving both high pressure and high temperature to achieve sterilization of food having a pH>4.5. This patent illustrates the difficulty associated with inactivation of polyphenol oxidase. Meyer inactivates polyphenol oxidase by de-aerating the product in an initial pre-sterilization process, then pressurizing at 90,000 psi at a temperature of 110° F. to deactivate the enzyme. Sterilization is accomplished by two subsequent elevated temperature pressure cycles. Meyer indicates that high temperature, high pressure treatment is overkill for foods with a pH less than 4.5.

U.S. Pat. No. 6,537,601 to Volson discloses a hydrostatic pressure process, but requires a high temperature in addition to a pressure between 10,000 to 60,000 psi, with the pressure being applied for 1 to 15 minutes.

SUMMARY OF THE INVENTION

After the typical HPP process has been used some enzymes are deactivated. However, one particular enzyme, polyphenol oxidase (PPO) is still active even after being subjected to the typical HPP process. PPO is an enzyme responsible for fruit and vegetable discoloration. Alternative blanching processes along with the HPP process can be used to deactivate PPO; however blanching (as well as other heating processes) is detrimental to color, flavor, and texture. Surprisingly, though, HPP with careful adjustment of pH in a solution bathing fruits and/or vegetables synergistically resulted in pasteurization including deactivation of PPO so that the vibrant green color of vegetables is substantially retained and discoloration of fruits is substantially avoided.

A process which overcomes the problems and deficiencies associated with the known HPP processes preferably includes the steps of:

(a) placing prepared fruits and/or vegetables in a container;
(b) filling the container with a pH modifying solution or sauce to establish a pH for the fruit in sauce/modifying solution in the container in the range of about 2 to about 6;
(c) dearation of the product in the container;
(d) sealing the container under vacuum in the range of about 1 to about 30 inches of vacuum;
(e) placing the container into the HPP unit for a period in the range of about 1 to about 10 minutes;
(f) applying pressure to the container surrounded by liquid in the range of about 2,000 to about 120,000 psi for a time period in the range of about 1 to about 20 minutes at a temperature in the range of about 32° to about 230° F.

Ideally, the single-step pressurization process may be applied to a fruit and/or vegetable piece surrounded by an acidic medium, which may be a brine or a sauce, at a pH around 4 in a sealed container.

BRIEF DESCRIPTION OF THE DRAWING

Many objects and advantages of this invention will be apparent to those skilled in the art when this specification is read in conjunction with the appended FIGURE, wherein:

FIG. 1 is a schematic depiction of the process steps involved pasteurization of fruits or vegetable according to this disclosure.

DETAILED DESCRIPTION

When packaging food items for distribution, sale, and consumption by consumers, such food items must be carefully processed in a manner that the food item will be preserved against spoilage, and against accidental delivery of harmful microorganisms and enzymes. Moreover, faced with the current trend in food packaging to provide food items in transparent film packaging materials, the physical appearance of the packaged food items also becomes important. For example, packaging processes which result in color and/or texture changes are much less desirable than packaging process which maintains natural color and/or texture.

High pressure processes ("HPP") for pasteurizing food items have been found to be effective as a mechanism to inactivate or eliminate most bacteria and microorganisms in vegetables while maintaining quality and freshness. HPP also extends shelf-life for the packaged food item against unacceptable microorganism levels. But as the prior art discussed above demonstrates, the typical HPP processes for fruits and vegetables also include a thermal treatment—such as blanching.

As presently understood, the HPP process applies significant hydraulic pressure to a food item. That hydraulic pressure ruptures the cell walls of microorganisms in fruits and vegetables thereby causing death of those microorganisms. At the same time, many undesirable enzymes in fruits and vegetables subjected to HPP are also deactivated. That being said, however, not all enzymes in fruits and vegetables are inactivated by HPP. By way of example, one particular enzyme, polyphenol oxidase (PPO) is still active even after being subjected to the typical HPP process. PPO is an enzyme which has been found to be responsible for fruit and vegetable discoloration during distribution and storage of packaged fruits and vegetables.

PPO can, however, be deactivated by a thermal process. Accordingly, a blanching process in combination with the HPP process can be used to deactivate PPO. Unfortunately, however, blanching (as well as other heating processes) is also detrimental to color, flavor, and texture in fruits and vegetables. The detrimental effect of blanching and/or heating is particularly noticeable in green vegetables where the heat apparently destroys or adversely affects the chlorophyll structure giving rise to discoloration and browning of the green vegetable color.

The process described and discussed below does not use a thermal step in packaging of food items such as fruits and/or vegetable pieces, and thus avoids the deleterious affects of the heating step.

Turning now to FIG. 1, the process of this invention begins with the preparation of a food item for packaging. In the preparation step 10, the food item is cleaned to remove foreign matter. Such cleaning typically includes a washing process. In addition, the preparation step may include subdividing the food item into pieces of the desired size by cutting, slicing, dicing, pureeing, peeling, mashing, and the like.

Suitable food items for processing according to this invention include, without limitation, fruits, and/or vegetables, whole and/or comminuted to smaller sizes. Typical fruits suitable for the process of this invention may include, without limitation, apples, peaches, pears, oranges, lemons, limes, grapefruit, grapes, cherries, and the like. Typical vegetables suitable for the process of this invention may include, without limitation, green vegetables, orange vegetables, starchy vegetables, root vegetables, peas and beans, and other vegetables. Typical green vegetables for use in the process include, without limitation, celery, green beans, green peppers, snow peas, snap peas, asparagus, zucchini, broccoli, cucumbers, grape tomatoes, onions, and the like.

Typical packages range in size from individual portions (e.g., in the range of about 1 to about 8 ounces), through family-size portions (e.g., in the range of about 6 to about 32 ounces), to commercially used portions (e.g., in the range of about 16 to about 256 ounces). Accordingly, the preparation step may include consideration of the volume or size of the ultimate package. For example, the preparation step may be selected so that the fruit or vegetable is diced to conveniently fit in an individual portion package having a volume of about 4 ounces.

In any event, after the food item has been prepared, the food item is packaged 20 in a container having a predetermined volume. As can be seen from the foregoing discussion, the package can range from a small container having a volume on the order of 1 ounce to a multi-gallon container having a volume on the order of 2 gallons (256 ounces) or more. A suitable package envelops the food item and includes at least a portion that is sufficiently flexible to transmit substantial hydrostatic pressure from the outside of the package to the inside of the package without rupturing or mechanically failing. Thus, the package may, for example, comprise a flexible bag or pouch, a relatively rigid cup with a flexible film cover, or the like. The package will also be made from a suitable food-safe material.

With the prepared food in the package, a pH modifying material is added 30 to substantially fill any voids in the package. Alternatively, the pH-modifying material may be placed in the package before the food item, and then topped-off as needed to fill the package. The pH-modifying material preferably has a pH lying in the range of about 2 to about 6, thereby creating an acidic environment within the container. More preferably, however, the pH of the pH-adjusted food material is about 4. This acidic environment is believed to be counterintuitive, particularly for green vegetables. More specifically, green vegetables are known to exhibit saturated green coloration in an alkaline environment (i.e., a pH greater than 7) and to exhibit lighter, less saturated, green coloration in an acidic environment. Thus, establishment of an acidic environment would appear to be the wrong environment to maintain green coloration.

Typically, it is anticipated that the pH-modifying material will be a liquid, and may be a liquid having a sufficiently high viscosity that the liquid flows slowly as compared to, for example, water. The fluid nature of the pH-modifying material or medium is important because the material must also be capable of transmitting hydrostatic pressure. By way of example, the pH-modifying medium may comprise a brine solution including water and acid, such as citric acid, vinegar, or any organic or inorganic food-grade acid. In addition, the pH-modifying medium may include other additives such as, for example and without limitation, sugar, salt, olive oil, hydrocolloids such as xanthan gum, pepper puree, and/or flavorings. Another pH-modifying medium may comprise tomato juice, with or without one or more additives.

Now, with the food item in the package, and the package substantially filled with a pH-modifying solution, head space in the package is minimized 40 to substantially eliminate air from the package. Air is eliminated to enhance package integrity and to decrease resistance to pressure transfer to the product through the package. Thus, air should be eliminated from the package to the extent practical.

With the head space thus minimized 40, the package may be dearated 50 under vacuum conditions and then sealed 60 so as to be fluid tight. The sealing step may include a heat-sealing operation whereby adjacent material layers are heated sufficiently to be melted together, or otherwise attached to one another in a fluid-tight, pressure-tight manner. In any event, such a heat-sealing operation is sufficiently localized on the container that the heat-sealing operation does not materially change or alter the temperature of the package contents.

The HPP process is then applied 70 to the sealed package. Operating conditions for the HPP process include a hydrostatic pressure in the range of about 2,000 psi to about 120,000 psi. More preferably the hydrostatic pressure may be in the range of about 70,000 to about 100,000 psi. Even more preferably, the hydrostatic pressure may lie in the range of about 80,000 to about 90,000 psi. Pressures below the most preferred range are less desirable because a longer process time is required. Pressures above the most preferred range are less desirable because more expensive equipment is needed to safely handle the higher pressures.

The HPP process may be applied at a temperature ranging from a low temperature that is higher than the larger of (a) the freezing temperature of the food item and (b) the freezing temperature of the pH-modifying medium. The temperature of the HPP process should be below a high temperature which corresponds to the boiling temperature of the pH-modifying medium, so that liquid-gas phase change is substantially avoided inside the package. Stated differently, the temperature at which the HPP process is conducted preferably lies in the range of about 32° F. to about 230° F., more preferably in the range of about 35° F. to about 100° F., and most preferably in the range of about 35° F. to about 55° F.

Duration of the HPP process is also important for consumer food items. Generally, the HPP process is applied to the filled, sealed package for a duration of about 1 to about 20 minutes, and most preferably for about 5 minutes. The longer time periods are appropriate when the hydrostatic pressure employed is at the lower regions of the preferred pressure range, while the shorter time periods are appropriate when the hydrostatic pressure employed is at the higher end of the preferred pressure range.

When the HPP process step has been completed, the HPP system is depressurized 80 and the treated package removed from the system. At that point, the individual package may be assembled into shipping cartons, and then delivered, with or without refrigeration, to a distribution system for allocation to wholesalers and retailers for ultimate sale to consumers.

While the process described above applies particularly to a single package, it is to be understood that multiple packages can be processed substantially simultaneously at one or more of the various processing steps discussed above.

To further enhance the description of the preferred embodiments of this invention, several examples of the implementation of the process described above will now be further described.

In the following examples, the HPP device used was manufactured by nc Hyperbaric, having a 55 liter capacity, identified as the Wave 6000/55 model. For testing in the examples, product was prepared in cups having a 6 ounce capacity. From 6 to 150 such cups or containers were involved in the tests of the examples.

EXAMPLE 1

The food item for this example was celery. Celery was cleaned, and washed. The clean celery was cut into slices and weighed into 4 ounce containers. A brine solution was then added to the containers. The brine solution included water, salt, sugar, acid, and flavor, as set forth in the table below. Brine was added to the top of each container to minimize head space. The containers were then sealed under vacuum conditions and loaded into the chamber of an HPP unit. The HPP unit was operated at a pressure of 87,000 psi for 5 to 10 minutes at a temperature of 35° F. to 55° F. After depressurization, the containers were removed from the HPP chamber.

| Ingredients | Weight Percent |
|---|---|
| Brine | |
| Water | 41% |
| Salt | 1.5% |
| Sugar | 5.7% |
| Vinegar, 50 grain | 8.8% |
| Celery | 43% |
| Total | 100% |

EXAMPLE 2

The food item was green bell peppers. Green bell peppers were cleaned, and washed. The clean bell peppers were cut into slices and weighed into 4 ounce containers. A brine solution was then added to the containers. The brine solution included water, salt, sugar, acid, and flavor, as set forth in the table below. Brine was added to the top of each container to minimize head space. The containers were then sealed under vacuum conditions, and loaded into the chamber of a HPP unit. The HPP unit was operated at a pressure of 87,000 psi for 5 to 10 minutes at a temperature of 35° F. to 55° F. After depressurization, the containers were removed from the HPP chamber.

| Ingredients | Weight Percent |
|---|---|
| Brine | |
| Water | 40.5% |
| Salt | 1.3% |
| Sugar | 5.6% |
| Vinegar, 50 grain | 8.6% |
| Green Bell Pepper | 44% |
| Total | 100% |

EXAMPLE 3

The food item was broccoli. The broccoli was cleaned, and washed. The clean broccoli was cut into broccoli florets and weighed into 4 ounce containers. A brine solution was then added to the containers. The brine solution included water, salt, sugar, acid, and flavor, as set forth in the table below. Brine was added to the top of each container to minimize head space. The containers were then sealed under vacuum conditions, and loaded into the chamber of a HPP unit. The HPP unit was operated at a pressure of 87,000 psi for 5 to 10 minutes at a temperature of 35° F. to 55° F. After depressurization, the containers were removed from the HPP chamber.

| Ingredients | Weight Percent |
| --- | --- |
| Brine | |
| Water | 43.3% |
| Salt | 1.4% |
| Sugar | 6.0% |
| Vinegar, 50 grain | 9.3% |
| Broccoli | 40% |
| Total | 100% |

EXAMPLE 4

The food item was zucchini. The zucchini was cleaned, and washed. The clean zucchini was cut into slices and weighed into 4 ounce containers. A brine solution was then added to the containers. The brine solution included water, salt, sugar, acid, and flavor, as set forth in the table below. Brine was added to the top of each container to minimize head space. The containers were then sealed under vacuum conditions, and loaded into the chamber of a HPP unit. The HPP unit was operated at a pressure of 87,000 psi for 5 to 10 minutes at a temperature of 35° F. to 55° F. After depressurization, the containers were removed from the HPP chamber.

| Ingredients | Weight Percent |
| --- | --- |
| Brine | |
| Water | 39% |
| Salt | 1.3% |
| Sugar | 5.4% |
| Vinegar, 50 grain | 8.3% |
| Zucchini | 46% |
| Total | 100% |

EXAMPLE 5

The food item was a medley of cucumbers, grape tomatoes, green peppers, and onions. The cucumbers, grape tomatoes, green peppers, and onions were cleaned, and washed. The clean cucumbers, onions, and green peppers were diced; the grape tomatoes were left whole. The diced cucumbers, diced green peppers, and diced onions were mixed and combined with the grape tomatoes according to a recipe, as set forth in the table below. The combined vegetables were then weighed into 4 ounce containers. A sauce was then added to the containers. The sauce included tomato juice, red bell pepper puree, olive oil, vinegar, garlic puree, salt, and xanthan gum. Sauce was added to the top of each container to minimize head space. The containers were then sealed under vacuum conditions, and loaded into the chamber of a HPP unit. The HPP unit was operated at a pressure of 87,000 psi for 5 to 10 minutes at a temperature of 35° F. to 55° F. After depressurization, the containers were removed from the HPP chamber.

| Ingredients: | Weight Percentage |
| --- | --- |
| Sauce | |
| Tomato Juice | 20.46% |
| Olive Oil | 2.5% |
| Xanthan gum | 0.04% |
| Garlic puree | 0.5% |
| Salt | 1.0% |
| Red Pepper Puree | 7.5% |
| Vinegar, 50 grain | 2.0% |
| Vegetable | |
| Whole grape tomatoes | 33% |
| Cucumber | 11% |
| Red Onion | 7.5% |
| Green Bell Pepper | 14.5% |
| Total | 100% |

In the foregoing description of the invention, the word "substantially" is often used as an adjective with the intent to provide a reasonable amount of latitude for the modified term so as to avoid unnecessarily narrow and restrictive interpretation of the modified term. In addition, in the foregoing description, the word "about" is often used in connection with numerical values with the intent to avoid unnecessarily narrow and restrictive interpretations of the numerical value. To this end, any numerical value modified by the word "about" should be considered to include numerical values within a tolerance of ±10%, unless the context indicates otherwise.

It will now be apparent to those skilled in the art that this specification describes a new, useful, and non-obvious process for preparing preserved food items, such as fruits and/or vegetables. Moreover, it will also be apparent to those skilled in the art that numerous modifications, variations, substitutions, and equivalents exist for the processes and steps described. Accordingly, it is expressly intended that all such modifications, variations, substitutions, and equivalents which fall within the spirit and scope of the appended claims shall be embraced thereby.

What is claimed is:

1. A preservation process for fruits, vegetables, and combinations thereof comprising the steps of:
    placing a food item in a package;
    adding a pH modification medium to the package to achieve a combined pH for the product and medium in the range of about 2 to about 6;
    establishing a liquid environment in the package to substantially fill any voids in the package;
    sealing the package under 1-30 inches of vacuum;
    subjecting the sealed package to a pressure in the range of about 2,000 to about 120,000 psi at a temperature in the range of about 35° F. to about 55° F. for a time period in the range of about 1 to about 20 minutes to sterilize the food item; and depressurizing the sealed package such that the vibrant color of green vegetables is substantially retained and discoloration of fruits is substantially avoided.

2. The preservation process of claim 1 including the further step of preparing the food item for packaging by cleaning, washing, and, optionally dividing the food item into appropriately sized pieces.

3. The preservation process of claim 1 including the placing step includes the step of placing into the package at least one food item selected from the group of fruits, vegetables, and the like.

4. The preservation process of claim 1 wherein the sealed package is subjected to a pressure for a time period in the range of about 1 to about 10 minutes.

5. The preservation process of claim 1 wherein the step of adding a pH modification medium includes the step of adding a tomato-based sauce.

6. The preservation process of claim 1 wherein the step of adding a pH modification medium includes applying a medium with a pH of about 4.

7. The preservation process of claim 1, wherein the food item is a green vegetable.

8. The preservation process of claim 1, wherein the product and the medium have a combined pH of about 4.

9. The preservation process of claim 1 wherein the step of establishing a liquid environment in the package includes the step of minimizing the volume of any gas in the package.

10. The preservation process of claim 9 wherein the minimization step occurs under vacuum conditions.

11. The preservation process of claim 1 wherein the sealed package is subjected to a pressure in the range of about 70,000 to about 100,000 psi.

12. The preservation process of claim 11 wherein the sealed package is subjected to a pressure in the range of about 80,000 to about 90,000 psi.

13. The preservation process of claim 1 wherein the step of adding a pH modification medium includes the step of adding a brine solution to the package.

14. The preservation process of claim 13 wherein the step of adding a pH modification medium includes the step of adding solution including a food grade acid.

15. The preservation process of claim 14 wherein the step of adding a brine solution to the package includes adding a solution of water, salt, sugar, flavor, and a food-grade acid.

* * * * *